Patented Oct. 19, 1926.

1,603,318

UNITED STATES PATENT OFFICE.

JOHN T. CHARLESON, OF AKRON, OHIO, ASSIGNOR TO THE GOODYEAR TIRE & RUBBER COMPANY, OF AKRON, OHIO, A CORPORATION OF OHIO.

PROCESS OF MANUFACTURING A RUBBERIZED-FIBER COMPOSITION.

No Drawing.     Application filed July 31, 1922. Serial No. 578,789.

My invention relates to a method of making a rubberized fiber composition which may be utilized in a variety of capacities, such as for floor or wall coverings, as a substitute for leather, or for any other purpose to which a tough flexible porous water-resistant composition may be adapted. My invention has particular relation to the method of treating the rubber prior to its deposition on the fibers.

The object of my invention is to provide an improved method of manufacturing a composition, of the character designated, which shall simplify the manufacture and reduce the cost thereof.

Heretofore it has been customary, in the manufacture of rubberized fiber composition, to dissolve into the liquid in which the fiber is held in suspension, approximately twice as much rubber as was intended to be deposited upon the fibers. The reason for dissolving the excess rubber is that with rubber as ordinarily used, when precipitation takes place, approximately only one-half of the rubber in the solution is properly deposited upon the fibers. The remainder, therefore, precipitates in a flocculent state in which it segregates itself from the fiber in the liquid. The reason for this phenomenon is rather difficult to explain unless it be that there are two different kinds of rubber in the solution, one portion of which is polymerized to a greater degree than is the other portion.

I have found that by depolymerizing the rubber prior to mixing it with the liquid in which the fibers are in suspension, all the rubber in solution may be deposited upon the fibers and the difficulty is eliminated. The rubber may be depolymerized either by heating when in solution or by masticating it thoroughly prior to dissolving it. In the former method, the temperature to which the solution must be raised varies between 50° C. and 100° C., depending upon the boiling point of the solvent.

Precipitation of rubber in solution might be regarded as withdrawing the toluol, or other solvent, from a mass of swollen rubber, causing it to shrink as the solvent is removed. If the rubber has not been depolymerized, it has a very strong tendency, upon being precipitated, to shrink into knots or clots which lie between the fibers rather than coating them. However, when depolymerized rubber is precipitated, the molecular structure of the rubber is such that the tendency to shrink into large knots, upon precipitation, is materially reduced and the rubber therefore clings much better to the fibers and forms a much more uniform coating of rubber thereon.

In carrying out my invention, I mix a quantity of finely divided fibers in a liquid comprising approximately 77% toluol and 23% alcohol. The liquid is then agitated to thoroughly disperse the fibers therein. A solution of rubber is then prepared by heating it to a relatively high temperature for a sufficient length of time to depolymerize it. The time element, as well as the temperature, is an important feature. For example, a rubber solution which is depolymerized by raising it to a temperature of 90° C. for one hour must be heated at 60° C. for three hours to obtain the same result. It is then added to the liquid in which the fibers are in suspension. After being thoroughly mixed therewith, the rubber is precipitated upon the fibers, either by the addition of a precipitating agent, such as alcohol, acetone, or the like, or by properly lowering the temperature of the solution. If the rubber has been properly depolymerized, all of the rubber is precipitated in a semi-colloidal state and forms a thin uniform coating upon the fibers, after which the fibers are so strained from the liquid as to produce a mat formation. The mat may then be dried and cured.

The rubber may also be depolymerized prior to its mixture with the liquid by milling or masticating it, after which the rubber is dissolved in the liquid having the fibers in suspension. The remainder of the process of manufacturing a material, using the milled rubber, is identical with that described in connection with the method of depolymerization while in solution by heating.

Generally speaking, the depolymerized rubber may be said to tend to form a coating on the individual fibers, whereas the undepolymerized rubber tends to become a filler therebetween.

Although I have described in detail but a single application of my invention, it will be obvious to those skilled in the art that it is not so limited, and that various minor modifications and changes may be made therein without departing from the spirit of my invention or from the scope of the appended claims.

What I claim is:

1. The method of treating unvulcanized rubber to improve its uniformity that comprises heating a solution thereof to depolymerize the rubber and subsequently removing the solvent.

2. The method of making a fibrous composition which comprises suspending a quantity of fibers in a rubber solvent, depolymerizing a quantity of rubber, dissolving said rubber in the solvent, precipitating the rubber on the fibers, straining the fibers from the liquid, and curing the resulting product.

3. The method of making a fibrous composition which comprises suspending a quantity of fibers in a rubber solvent, dissolving a quantity of rubber in the solvent, heating said solution so as to effect depolymerization of the rubber, precipitating the rubber on the fibers, so straining the fibers from the liquid as to form a mat, and curing the mat.

4. The method of making a fibrous composition which comprises suspending a quantity of fibers in a rubber solvent, raising the temperature of a rubber solution not to exceed the decomposition point thereof, mixing said rubber solution and said solvent, precipitating the rubber on the fibers, so straining the fibers from the solution as to form a mat, and curing the mat.

5. The method of making a fibrous composition which comprises suspending a quantity of fibers in a rubber solvent, depolymerizing a quantity of rubber in solution, mixing said depolymerized rubber and said solvent, precipitating the rubber on the fibers, so straining the fibers from the solution as to form a mat, and curing the mat.

6. The method of making a fibrous composition which comprises distributing a quantity of fibers in a suspending medium, depolymerizing a quantity of rubber, mixing said rubber with said suspending medium, precipitating the rubber on the fibers, so straining the fibers from the solution as to form a mat, and curing the mat.

7. In a method of manufacturing a fibrous rubber composition, those steps in the process which consist in depolymerizing the rubber by heating it in the presence of a solvent and incorporating a fibrous material thereinto before removing the rubber solvent.

8. In a method of manufacturing a fibrous rubber composition, those steps in the process which consist in depolymerizing the rubber by heating it while in solution and incorporating a fibrous material thereinto before precipitating the dissolved rubber.

In witness whereof, I have hereunto signed my name.

JOHN T. CHARLESON.